United States Patent
Goldman et al.

(10) Patent No.: US 11,783,542 B1
(45) Date of Patent: Oct. 10, 2023

(54) MULTI-VIEW THREE-DIMENSIONAL MESH GENERATION

(71) Applicant: Amazon Technologies, Inc., Seattle, WA (US)

(72) Inventors: Matan Goldman, Redmond, WA (US); Lior Fritz, Redmond, WA (US); Omer Meir, Redmond, WA (US); Imry Kissos, Redmond, WA (US); Yaar Harari, Redmond, WA (US); Eduard Oks, Redmond, WA (US); Mark Kliger, Modi'in-Macabim-Reut (IL)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 183 days.

(21) Appl. No.: 17/489,487

(22) Filed: Sep. 29, 2021

(51) Int. Cl.
| | |
|---|---|
| *G06T 17/20* | (2006.01) |
| *G06T 7/20* | (2017.01) |
| *H04N 5/04* | (2006.01) |
| *G06N 3/08* | (2023.01) |
| *G06T 7/70* | (2017.01) |
| *G06N 3/045* | (2023.01) |

(52) U.S. Cl.
CPC ............ *G06T 17/20* (2013.01); *G06N 3/045* (2023.01); *G06N 3/08* (2013.01); *G06T 7/20* (2013.01); *G06T 7/70* (2017.01); *H04N 5/04* (2013.01); *G06T 2207/30196* (2013.01); *G06T 2207/30244* (2013.01)

(58) Field of Classification Search
CPC .. G06T 17/20; G06T 7/70; G06T 7/20; G06T 2207/30196; G06T 2207/30244; H04N 5/04
See application file for complete search history.

(56) References Cited

U.S. PATENT DOCUMENTS

| 10,679,046 B1 * | 6/2020 | Black ..................... G06V 40/23 |
| 2005/0063582 A1 * | 3/2005 | Park ........................ G06T 17/10 |
| | | 382/181 |

(Continued)

OTHER PUBLICATIONS

Kanazawa, Angjoo, Proceedings of the IEEE Conference on Computer Vision and Pattern Recognition (CVPR), 2018, pp. 7122-7131 (Year: 2018).*

(Continued)

*Primary Examiner* — Terrell M Robinson
(74) *Attorney, Agent, or Firm* — K&L Gates LLP (57) ABSTRACT

Devices and techniques are generally described for three dimensional mesh generation. In various examples, first two-dimensional (2D) image data representing a human body may be received from a first image sensor. Second 2D image data representing the human body may be received from a second image sensor. A first pose parameter and a first shape parameter may be determined using a first three-dimensional (3D) mesh prediction model and the first 2D image data. A second pose parameter and a second shape parameter may be determined using a second 3D mesh prediction model and the second 2D image data. In various examples, an updated 3D mesh prediction model may be generated from the first 3D mesh prediction model based at least in part on a first difference between the first pose parameter and the second pose parameter and a second difference between the first shape parameter and the second shape parameter.

20 Claims, 6 Drawing Sheets

(56) References Cited

U.S. PATENT DOCUMENTS

| | | | | |
|---|---|---|---|---|
| 2008/0180448 | A1* | 7/2008 | Anguelov | G06T 13/40 |
| | | | | 345/475 |
| 2010/0111370 | A1* | 5/2010 | Black | G06F 18/2321 |
| | | | | 705/26.1 |
| 2017/0147874 | A1* | 5/2017 | Perbet | G06T 17/10 |
| 2017/0316578 | A1* | 11/2017 | Fua | G06T 7/246 |
| 2019/0122429 | A1* | 4/2019 | Yang | G06V 40/16 |

OTHER PUBLICATIONS

M. Omran, C. Lassner, G. Pons-Moll, P. Gehler and B. Schiele, "Neural Body Fitting: Unifying Deep Learning and Model Based Human Pose and Shape Estimation," 2018 International Conference on 3D Vision (3DV), Verona, Italy, 2018, pp. 484-494, (Year: 2018).*

B. M. Smith, V. Chari, A. Agrawal, J. M. Rehg and R. Sever, "Towards Accurate 3D Human Body Reconstruction from Silhouettes," 2019 International Conference on 3D Vision (3DV), Quebec City, QC, Canada, 2019, pp. 279-288, (Year: 2019).*

Yu Sun and Qian Bao and Wu Liu and Wenpeng Gao and Yili Fu and Chuang Gan and Tao Mei, "Synthetic Training for Monocular Human Mesh Recovery", arXiv, 2020, pp. 1-11 (Year: 2020).*

* cited by examiner

MULTI-VIEW THREE-DIMENSIONAL MESH GENERATION

BACKGROUND

Accurately estimating three-dimensional ("3D") poses from two-dimensional ("2D") reference points is a classical ill-posed problem in computer vision. Methods for 3D pose prediction are typically classified into model-free and model-based approaches. Typically, model-free approaches directly learn a mapping from 2D reference points to 3D joints. Predicting 3D joints from 2D reference points is a challenging task, since an infinite number of 3D poses exist that correspond to a given 2D skeleton due to positive ambiguity. Model-based approaches often fit 3D parametric models such as the skinned multi-person linear ("SMPL") representation to estimate 3D shape and pose. This is typically done by minimizing the 2D error between the projection of the predicted 3D pose in the 2D space and the given 2D reference points. However, 2D re-projection error alone is highly under-constrained and can be minimized via non-natural joint angles. To address these issues, previous 2D to 3D approaches have used various kinds of additional 3D supervision, including paired 2D-3D correspondences, unpaired 3D data, and synthetic data generated using motion capture ("MoCap") sequences.

DETAILED DESCRIPTION

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Dense human body mesh prediction is critical for enabling various computer vision experiences such as body-rendering in gaming, virtual try-on for fashion, augmented reality, security applications, movie-making applications, exercise applications, etc. Many current algorithms fail to predict accurate 3D meshes when the body of the subject is in poses that are not well-represented (or which are unrepresented) in the training data. Additionally, in some cases, 3D meshes of human bodies may look natural from one vantage point, but may be ill-fitted when the view is rotated to a different viewpoint.

In some examples, a person detector may be used to detect people represented in a 2D image, followed by use of a 3D mesh prediction model to predict parameters of a 3D deformable mesh model of the person.

Many current 3D body mesh prediction algorithms and/or person detectors are trained using large scale dataset like Common Objects in Context (COCO), etc. In many cases, these datasets show people in common, everyday poses (e.g., walking, sitting, running, etc.). However, common exercise positions (e.g., various yoga poses, push-ups, sit-ups, etc.) are not well-represented in such datasets. Accordingly, subpar performance of person detector models and 3D body mesh prediction models for such underrepresented poses may be due to a lack of relevant training data.

Human mesh recovery (HMR) is a 3D mesh prediction model that is trained using end-to-end adversarial learning of human pose and shape parameters. In many cases, the pose and shape parameters output by HMR fit well to 3D SMPL model for a given 2D input image. However, when the 3D SMPL model is rotated (e.g., by 90 degrees) it can be easy to see that, in fact, the fitting only looks natural from the specific angle from which the image was captured. HMR models use 3D pose estimation loss (L3D) which should, in theory, improve this problem. However, 3D joints ground truth data is difficult to collect and tends to be noisy. Additionally, as described above, many poses of interest are underrepresented in the common pre-existing datasets.

Described herein is a neural network architecture that duplicates any 3D mesh prediction model (e.g., SMPL oPtimization IN the loop (SPIN), HMR, etc.) and enforces a consistency between the pose parameters $\theta$ and shape parameters $\beta$ being output by each model. The core intuition is that two images captured of the same human at the same moment in time (but from different vantages) input into the duplicated 3D mesh prediction models should output the same pose and shape parameters $\theta$ and $\beta$. Stated another way, $\theta$ and $\beta$ should be agnostic to the viewpoint and hence two different images (of the same person at the same moment in time from different perspectives) should produce similar pose and shape parameter values. In various examples, the performance of 3D mesh prediction models (e.g., HMR, SPIN: SMPL oPtimization IN the loop or any other 3D body mesh prediction model) may be improved using the various techniques described herein.

In some examples, the neural network architectures described herein are described as being "Siamese Neural Networks." In the literature, Siamese Neural Networks refer to classes of neural network architectures that include two or more identical subnetworks. In this sense, "identical" indicates that the subnetworks have the same configuration with the same parameters and weights. Parameter updating is mirrored across each subnetwork. Such an architecture may be used to find the similarity of the inputs by comparing its input feature set.

Joints and/or joint data, as described herein may correspond to anatomical human joints (e.g., elbow joint, shoulder joint, etc.), but may also include, in at least some cases other points on the human form that are not traditionally described as joints. For example, a system may use 17 joints including {'nose', 'left_eye', 'right_eye', 'left_ear', 'right_ear', 'left_shoulder', 'right_shoulder', 'left_elbow', 'right_elbow', 'left_wrist', 'right_wrist', 'left_hip', 'right_hip', 'left_knee', 'right_knee', 'left_ankle', 'right_ankle'}. Other systems and/or implementations may use other joints (sometimes referred to as "key points") apart from those noted in the foregoing example.

Machine learning approaches have been used for 3D pose estimation of 2D image data and for human detection in 2D image data. Machine learning techniques are often used to form predictions, solve problems, recognize objects in image data for classification, etc. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model may be referred to as back propagation.

Model-based approaches for 3D human mesh generation often use a parametric model, such as SMPL, to estimate human meshes (e.g., 3D mesh representations of the human form). Several model-based approaches have used 3D supervision during training. The 3D information has been used in various forms such as paired 2D-3D data, 3D pose priors (e.g., a Gaussian Mixture Model) built using 3D motion capture sequences, learned priors using 3D data via discriminator models, and synthetic 2D-3D pairings.

SMPL is a realistic 3D model of the human body. SMPL takes pose parameters $\theta \in \mathbb{R}^{72}$ for 3D angles of joints and root orientation and shape parameters $\beta \in \mathbb{R}^{10}$ to control thinness of torso and limbs as input. SMPL outputs dense body mesh 3D vertices $M \in \mathbb{R}^{6890 \times 3}$ and 24 3D human joints (e.g., joint data) of interest from linear combination of dense vertices: $J \in \mathbb{R}^{24 \times 3} = WM$, where W is the linear regressor.

The SMPL body is projected into the 2D image plane by multiplying by a projection matrix $K_{2 \times 3}$ for orthographic projection.

$$K = \begin{bmatrix} s & 0 & t_x \\ 0 & s & t_y \end{bmatrix}$$

where K is parameterized by scale s and 2D horizontal and vertical translation ($t_x$, $t_y$). Rotation is not needed in projection matrix, as the first three values in SMPL pose parameter $\theta$ represent global rotation.

SMPLify is an algorithm that jointly fits SMPL pose parameters $\theta$, shape parameters $\beta$, and projection matrix K onto 2D joints $J_{gt}$ in re-projected 2D image data. The objective function minimized by SMPLify is:

$$\min_{\theta, \beta, K} E_{fit} = E_J(\beta, \theta; K, J_{gt}) + \lambda_\theta E_\theta(\theta) + \lambda_\alpha E_\alpha(\theta) + \lambda_\beta E_\beta(\beta)$$

The first term $E_J(\beta, \theta; K, J_{gt})$ represents the re-projection error between ground truth 2D joints $J_{gt}$ and reprojected SMPL joints J, and may be computed as 2D Euclidean distance. $E_\theta(\theta)$ is a mixture Gaussians pose prior loss. $E_\alpha(\theta)$ is the pose prior loss for elbows and knees to penalize unnatural rotations. $E_\beta(\beta)$ is the quadratic regularization term for shape parameters to penalize unnatural shape. $\lambda_{74}$, $\lambda_\alpha$, $\lambda_\beta$ are weights for the relevant loss terms.

SPIN is a 3D mesh prediction algorithm that trains a convolutional neural network (CNN) to predict SMPL pose, shape, and projection matrix for each input 2D image. During training, the network prediction is used as initialization of SMPLify to fit SMPL parameters onto 2D ground truth label data (e.g., key points). The optimized SMPL parameters are then used to explicitly supervise the prediction of the network. This procedure is called mesh fitting in the loop. It has synergistic self-improving nature: better SMPL fits improve network prediction, while better initialization assists in the convergence of the fitting process.

In various examples described herein, SPIN may be used as a 3D mesh prediction model for 3D human mesh estimation. The SPIN network assumes a single person with a full body (e.g., no invisible joints) in the image. For multi-person 3D mesh estimation, a person detector may be used to detect bounding boxes of humans in the image. Each human instance may be cropped for single person 3D mesh estimation.

Similar to SPIN, the goal of HMR is to reconstruct a full 3D mesh of a human body from a single input 2D image. In HMR, training images (2D images) are annotated with ground truth 2D joints. Additionally, some 3D joint annotation may be provided along with a pool of 3D meshes of human bodies of varying shape and pose. However, since the 3D meshes are not necessarily paired with a corresponding 2D image, the training data is typically referred to as "unpaired."

Figure 1:
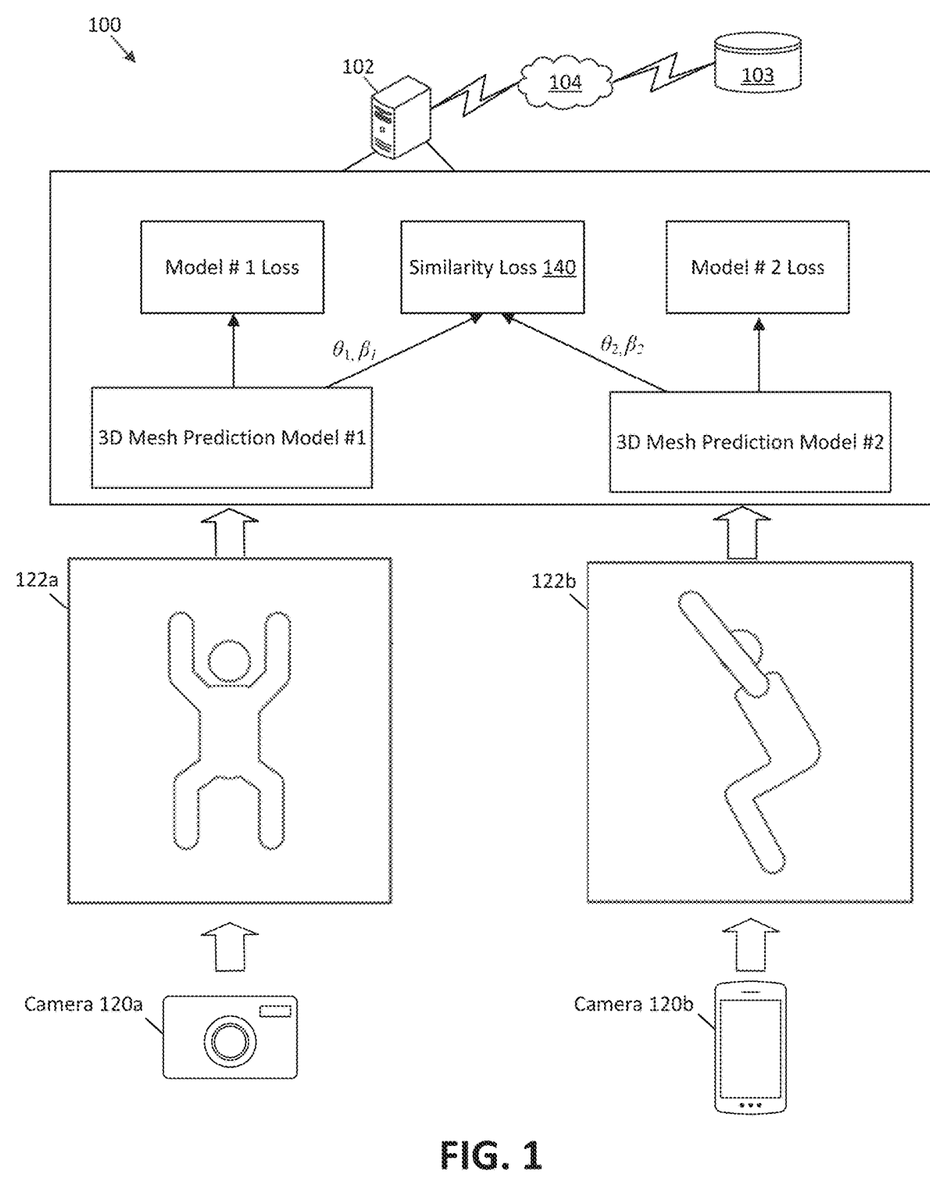
FIG. 1 is a diagram of an example system for multi-view 3D mesh generation, according to various aspects of the present disclosure.

FIG. 1 is a diagram of an example system 100 for multi-view 3D mesh generation, according to various embodiments of the present disclosure. Computing device(s) 102 may include non-transitory computer-readable memory 103 and/or may be configured in communication with non-transitory computer-readable memory 103, such as over network 104. In various examples, network 104 may represent a local area network (LAN) and/or a wide area network (WAN) such as the internet. In various examples, non-transitory computer-readable memory 103 may store instructions that may be used to implement the multi-view 3D mesh generation techniques, machine learning models (e.g., 3D mesh prediction models 1 and 2), parameters for the various machine learning models, training datasets, etc.

Figure 2:
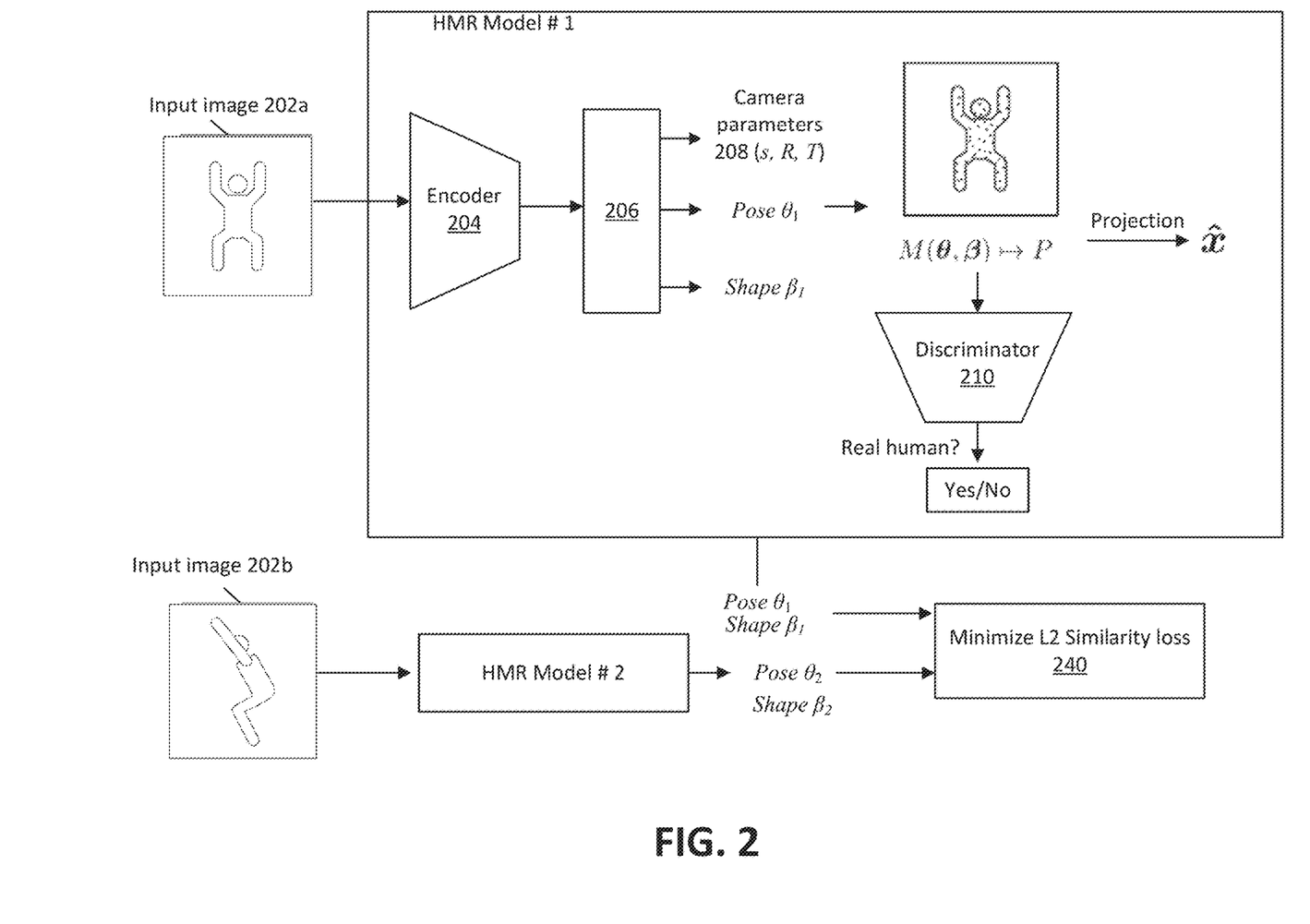
FIG. 2 depicts an example system for multi-view 3D mesh generation using a human mesh recovery (HMR) architecture, in accordance with various aspects of the present disclosure.

As previously described, the specific architecture of the 3D mesh prediction models used to implement the architecture shown in FIG. 1 is implementation specific. In FIG. 2, an example implementation of a multi-view 3D mesh generation system implemented using HMR is described. However, it should be appreciated that the various multi-view 3D mesh generation techniques described herein may be used with any 3D mesh prediction model and/or algorithm.

In various examples, system 100 may include two or more devices that include image sensors (e.g., camera 120*a* and camera 120*b*). The image sensors (e.g., cameras 120*a*, 120*b*) may be positioned so as to have overlapping fields-of-view. For example, a camera 120*a* may have an overlapping field of view that is offset from the field-of-view of camera 120*b*, by approximately 90 degrees (in the example depicted in FIG. 1). Accordingly, both a frontal and lateral view of the person performing an exercise may be captured by cameras 120*a*, 120*b*. It should be appreciated that this is merely an example and that the offset between the camera perspectives need not be 90°. Indeed, any desired offset may be used in accordance with the techniques described herein.

In some examples, the system 100 may output instructions for positioning of the cameras 120*a*, 120*b*. In some examples, one of the cameras may be a device that is relatively stationary, such as a virtual home assistant device that includes a camera and a display, while another camera may be integrated into a personal device, such as a smart phone and/or a digital camera. The system 100 may be effective to output instructions regarding positioning the cameras 120*a*, 120*b* with respect to one another. In some cases, the multi-view 3D mesh generation techniques may be implemented on one of the cameras 120*a*, 120*b*, while in other examples, the multi-view 3D mesh generation techniques may be implemented by another device, such as computing device(s) 102. For example, the computing device(s) 102 implementing the multi-view 3D mesh generation techniques may be a smart home hub system and/or another computing device within a user's home or other space. In some other cases, the computing device(s) 102 implementing the multi-view 3D mesh generation techniques may be at a remote location (e.g., a cloud-based server) that is accessible by cameras 120*a*, 120*b*.

It should also be appreciated that while the various techniques described herein are discussed with respect to two cameras and two 3D mesh prediction models, that the techniques may be used with more than two 3D mesh prediction models and cameras as well.

During training, each of the 3D mesh prediction models (e.g., 3D mesh prediction models 1 and 2) may receive an input 2D image. The input 2D images may correspond to the same human and may be captured at the same moment in time. Various techniques for synchronizing the two cameras 120*a*, 120*b* are discussed below in reference to FIG. 3. Accordingly, the two input images 122*a*, 122*b* represent two different vantages of the same human body captured at the same time.

Input image 122*a* may be input into 3D mesh prediction model 1 and input image 122*b* may be input into 3D mesh prediction model 2. 3D mesh prediction model 1 may generate a first pose parameter $\theta_1$ a first shape parameter $\beta_1$ representing a pose and a shape for a human mesh for input image 122*a*. Similarly, 3D mesh prediction model 2 may generate a second pose parameter $\theta_2$ and a second shape parameter $\beta_2$ representing a pose and a shape for a human mesh for input image 122*b*.

Loss may be determined for each model individually. For example, in an HAIR implementation, Model #1 Loss may include reprojection loss, adversarial loss, and 3D loss (if ground truth 3D information is available). Since the architecture is shared by both models, Model #2 Loss may include the same loss functions. Various example loss functions for HMR (including those mentioned above) are described in further detail below in reference to FIG. 2 for illustrative purposes.

In addition, similarity loss 140 may be determined. Since the pose parameter $\theta$ and the shape parameter $\beta$ should be agnostic to viewpoint for the input images 122*a*, 122*b*, the values of pose parameter $\theta$ and shape parameter $\beta$ should be similar for both 3D mesh prediction model 1 and 3D mesh prediction model 2. Accordingly, similarity loss 140 may be implemented as L2 loss functions, such as:

$$L_{\theta\_similarity} = \sum_{k=1}^{n} (\theta_1 - \theta_2)^2 \text{ and } L_{\beta\_similarity} = \sum_{k=1}^{n} (\beta_1 - \beta_2)^2.$$

Accordingly, the 3D mesh prediction models 1 and 2 may be updated (e.g., by updating weights of the models) not only by minimizing the Model #1 Loss and Model #2 Loss (e.g., individual model-specific loss functions), but also by minimizing the similarity loss 140. Although in the above example an L2 loss function is shown, the difference values (e.g., the difference between the respective pose parameters $\theta$ and shape parameters $\beta$ that are output by each 3D mesh prediction model) may be minimized in other ways. For example, L1 loss and/or other loss functions may be used. Additionally, the difference values may be expressed in terms of an absolute difference, a squared difference, etc. In some further examples, the pose and shape parameters (and/or the difference values between the respective pose parameters $\theta$ and shape parameters $\beta$ that are output by each 3D mesh prediction model) may be weighted so that each has different contributions to the total similarity loss 140.

In some examples, during inference, only a single model need be deployed and used. However, in some cases, use of more than one model may be advantageous during runtime. For example, if two (or more) cameras are available to a user, the system may be trained during each session (e.g., each exercise session) based on the different viewpoints (e.g., using the loss functions described above and/or other loss functions). Then, during inference, the shape and pose parameters output by each model may be averaged to generate a more holistic and improved 3D human mesh prediction that is specific to the user's environment, lighting conditions, camera parameters, etc. Additionally, using multiple cameras allows for self-supervised learning approaches where 2D ground truth points do not need to be annotated by a user. Instead, the assumption that pose and shape should be the same between each model may be used as a self-supervised signal and used to train the models. Further, training the models based on the particular cameras, camera placement, scene, lighting conditions, etc., that are being employed by the user customizes the model training for each use case, which may further improve the output. Further, in some examples, the model training may be personalized for particular users and/or for particular home settings (e.g., smart home lighting settings). In some cases, the 3D mesh prediction models may be executed and/or trained locally on devices local to the user, without sending image data over a network to a remote system. Such local implementations may reduce latency while mitigating privacy concerns.

Although many of the examples discussed herein describe a two camera (e.g., a two perspective) implementation, in other examples, more than two cameras and/or image sensors may be used to capture images of a user from multiple angles. Thereafter, the similarity between the pose and shape parameters output by each of the respective 3D mesh prediction models may be enforced by minimizing the respective differences between the shape and pose parameters output by the individual models.

In various examples, the 3D human meshes generated using the multi-view 3D mesh generation techniques described herein may produce highly accurate 3D human meshes particularly for unusual human poses that may be under-represented (or unrepresented) in the training data. In some cases, in a fitness application, the human meshes may be used to detect the current body positioning of the user. The 3D mesh representing the current body positioning may be compared to an ideal body positioning for the current exercise and a corrective action may be recommended (where appropriate) in order to have the 3D body mesh representing the human conform to an ideal pose for the current exercise and/or application. Additionally, tracking the 3D mesh of the user over time may allow goal-tracking and/or biometric information to be provided to the user. In many cases, the application (e.g., a fitness application, video game, etc.) may display a visual representation of the corrective action and/or the predicted 3D mesh to aid the user.

FIG. 2 depicts an example system for multi-view 3D mesh generation using a human mesh recovery (HMR) architecture, in accordance with various aspects of the present disclosure. As depicted in FIG. 2, input image 202a depicts a first view of a person. Input image 202b represents a second view of the person, from a different perspective, but which corresponds to the same moment in time (or approximately the same moment in time within a predefined tolerance) as the input image 202a. The HMR Models 1 and 2 may be instantiated in a Siamese architecture in accordance with the techniques described herein.

The HMR model architecture (including HMR Models 1 and 2) can be trained end-to-end. Encoder 204 may be, for example, a convolutional neural network (CNN) trained to extract features from the input image 202a. The convolutional features may be provided to an iterative 3D regression component 206 that is trained to infer the 3D human body pose and shape parameters as well as the camera parameters 208, such that its 3D joints project onto provided annotated 2D joints. The inferred parameters are also sent to an adversarial discriminator network 210 whose task it is to determine if the 3D parameters correspond to real human meshes (e.g., from the unpaired training data). This encourages the network to output 3D human bodies that are on the manifold of real human bodies and acts as a weak-supervision for images without ground truth 3D annotations. Due to the rich representation of the 3D mesh model, this data-driven prior can capture joint angle limits, anthropometric constraints (e.g. height, weight, bone ratios). When ground truth 3D information is available, it may be used as an intermediate loss. The overall loss for HMR Model # 1 (and, separately, for HMR Model # 2) is:

$$L=\lambda(L_{reproj}+\mathbb{1} L_{3D})+L_{adv}$$

where $\lambda$ controls the relative importance of each objective, $\mathbb{1}$ is an indicator function that is 1 if ground truth 3D is available for an image and 0 otherwise. Each component of the HMR Model is described in further detail below.

3D Body Representation

The 3D mesh of a human body may be encoded using SMPL. SMPL is a generative model that factors human bodies into shape—how individuals vary in height, weight, body proportions—and pose—how the 3D surface deforms with articulation. The shape $\beta \in \mathbb{R}^{10}$ is parameterized by the first 10 coefficients of a PCA shape space. The pose $\theta \in \mathbb{R}^{3K}$ is modeled by relative 3D rotation of K=23 joints in axis-angle representation. SMPL is a differentiable function that outputs a triangulated mesh with N=6980 vertices, $M(\theta, \beta) \in \mathbb{R}^{3 \times N}$, which is obtained by shaping the template body vertices conditioned on $\beta$ and $\theta$, then articulating the bones according to the joint rotations $\theta$ via forward kinematics, and finally deforming the surface with linear blend skinning. The 3D keypoints used for reprojection error, $X(\theta, \beta) \in \mathbb{R}^{3 \times P}$, are obtained by linear regression from the final mesh vertices.

In the example of FIG. 2, the weak-perspective camera model is used and global rotation $R \in \mathbb{R}^{3 \times 3}$ in axis-angle representation, translation $t \in \mathbb{R}^2$, and scale $s \in \mathbb{R}$ are solved for to obtain camera parameters 208. Note that these camera parameters will differ for each camera used in the Siamese architecture. In the example of FIG. 2, the set of parameters that represent the 3D reconstruction of a human body may expressed as an 85 dimensional vector $\Theta=\{\theta, \beta, R, t, s\}$. Given $\Theta$, the projection of $X(\theta, \beta)$ is $$\hat{x}=s\Pi(RX(\theta,\beta))+t,$$

where $\Pi$ is an orthographic projection.

The goal of the iterative 3D regression component 206 is to output given an image encoding 0 such that the joint reprojection error $$L_{reproj}=\Sigma_i \|v_i(x_i-\hat{x}_i)\|1$$

is minimized. Here $x_i \in \mathbb{R}^{2 \times K}$ is the ith ground truth 2D joints and $v_i \in \{0,1\}^K$ is the visibility (1 if visible, 0 otherwise) for each of the K joints.

However, directly regressing $\Theta$ in one go is a challenging task, particularly because $\Theta$ includes rotation parameters. Accordingly, in HMR, $\Theta$ is regressed in an iterative error feedback (IEF) loop, where progressive changes are made recurrently to the current estimate. Specifically, the 3D regression module takes the image features $\phi$ and the current parameters $\Theta_t$ as an input and outputs the residual $\Delta\Theta_t$. The parameter is updated by adding this residual to the current estimate $\Theta_t+1=\Theta_t+\Delta\Theta_t$. The initial estimate $\Theta_0$ is set as the mean $\bar{\theta}$ In HMR, estimates are retained in the latent space and the features $[\phi, \Theta]$ are concatenated as the input to the 3D regression component 206.

Additional direct 3D supervision may be employed when paired ground truth 3D data is available. The most common form of 3D annotation is the 3D joints. Below are the definitions of the 3D losses.

$$L_{3D}=L_{3D\ joints}+L_{3D\ smpl}$$

$$L_{joints}=\|(X_i-\hat{X}_i)\|_2^2$$

$$L_{smpl}=\|[\beta_i,\theta_i]-[\hat{\beta}_i, \hat{\theta}_i]\|_2^2$$

The reprojection loss encourages the network to produce a 3D body that explains the 2D joint locations, however anthropometrically implausible 3D bodies or bodies with gross self-intersections may still minimize the reprojection loss. To regularize this, the discriminator network D (e.g., discriminator network 210) is used. Discriminator network 210 is trained to tell whether SMPL parameters correspond to a real body or not.

A further benefit of employing a rich, explicit 3D representation like SMPL is that the meaning of the latent space is known. In particular SMPL has a factorized form that can be taken advantage of to make the adversary more data efficient and stable to train. The shape and pose decomposition of SMPL may be mirrored and a discriminator for shape and pose may be trained independently.

In traditional HMR, K+2 discriminators are trained. Each discriminator $D_i$ outputs values between [0, 1], representing the probability that $\Theta$ came from the data. In some examples, the least square formulation may be used for stability. Let E represent the encoder including the image encoder and the 3D module. Then the adversarial loss function for the encoder is $$\min L_{adv}(E) = \Sigma_i \mathbb{E}_{\Theta \sim pE}[(D_i(E(I))-1)^2],$$

and the objective for each discriminator is $$\min L(D_i) = \mathbb{E}_{\Theta \sim Pdata}[(D_i(\Theta)-1)^2] + \mathbb{E}_{\Theta \sim PE}[D_i(E(I))^2],$$

E and all $D_i$s may be jointly optimized.

Each of the different HMR models (e.g., HMR Models 1 and 2) may output respective pose and shape parameters. As previously described, these parameters may be used to calculate a different inter-network similarity loss. Accordingly, during training, L2 similarity loss 240 may be minimized.

Figure 3:
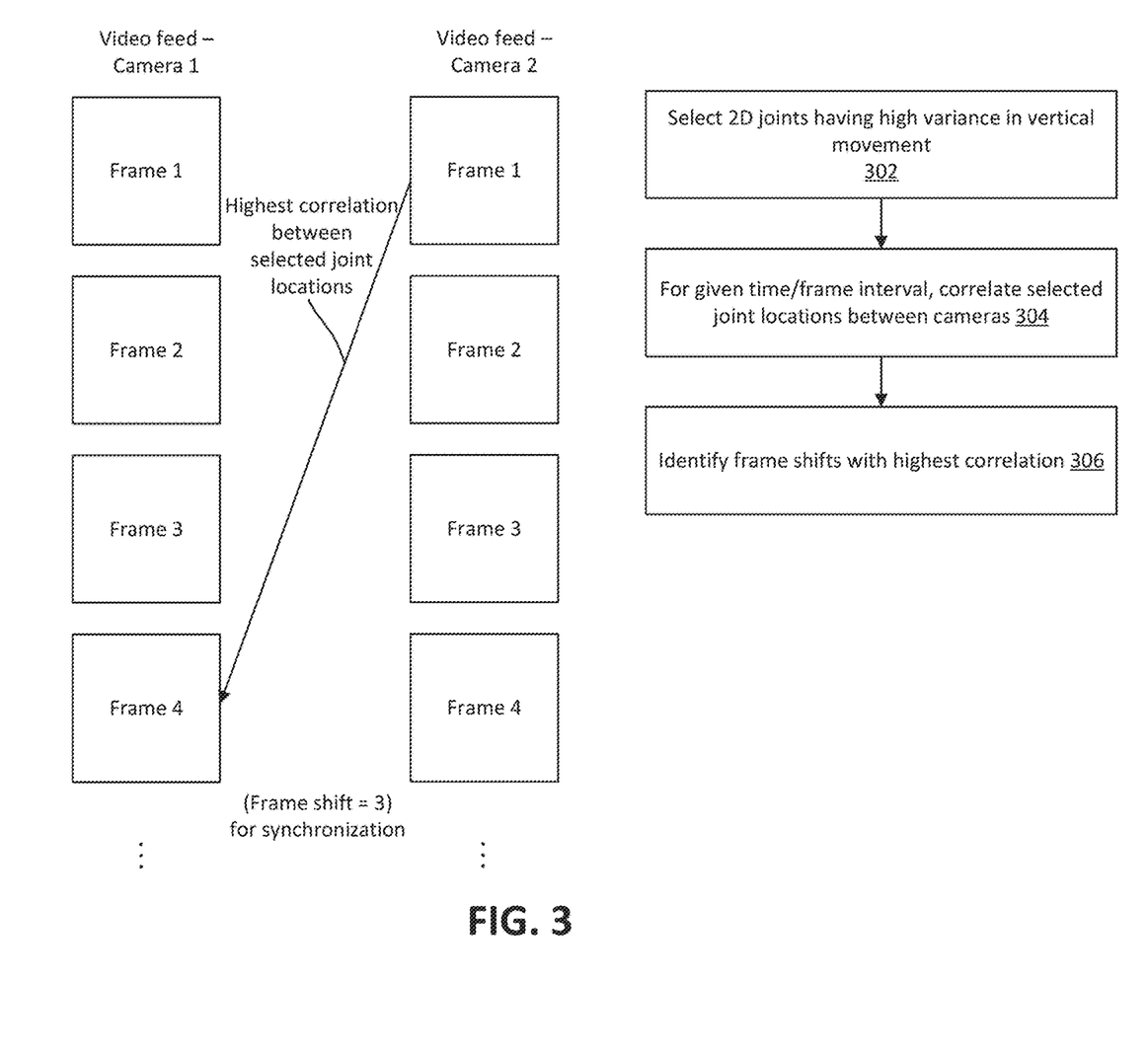
FIG. 3 depicts an example image frame synchronization technique for use with multi- view 3D mesh generation, in accordance with various aspects of the present disclosure.

FIG. 3 depicts an example image frame synchronization technique for use with multi-view 3D mesh generation, in accordance with various aspects of the present disclosure. In order to deploy the multi-view 3D mesh generation, the images input into the system should be as closely time-synced as possible. There are a variety of different techniques that may be employed to synchronize the cameras and/or the images captured by the cameras for input into the various multi-view 3D mesh generation systems described herein.

In one example, a sound may be emitted by a first camera device when the first camera device captures a frame of image data. Thereafter, a second camera device may determine an offset representing a time in which it takes the second camera device to receive the sound. The offset between camera frames in a video feed between each camera may be calculated using the offset. In another example, a smart home system may be used to control a smart light (e.g., a smart outlet and/or a smart bulb) to control a pattern of light output by the light (e.g., by switching a light on and off at a certain frequency). The time in which it takes the light to reach the individual image sensors may be used to determine an offset between the video feeds of the different image sensors.

FIG. 3 depicts a different example technique for synchronizing the cameras. In the example depicted in FIG. 3, camera 1 has a first video feed (including frames 1-4) and camera 2 has a second video feed (including frames 1-4). In various examples, each frame may depict a person. In some cases, a center of mass and/or joint locations of the person depicted in each frame may be calculated. In some examples, 2D joints that exhibit the highest variance in position along a vertical dimension (e.g., the y axis) among the frames may be selected (block 302).

Thereafter, for a given time interval (or frame interval), the selected 2D joints may be correlated between the two camera feeds (block 304). For example, a time interval of [−2, 2] seconds or a frame interval of [−60, 60] frames may be used. A selected joint may rise (or otherwise change locations) by some amount (or by some percentage) in one camera feed over the time/frame interval. A correlation in the movement of the joint (and of other selected joints) may be determined in the other camera feed. Thereafter, at block 306, the frame shift between the two camera feeds may be determined using the most highly correlated frames (and/or groups of frames).

In the example depicted in FIG. 3, the movement exhibited at frame 4 of the video feed of camera 1 may be highly correlated with the movement exhibited at frame 1 of the video feed of camera 2. Accordingly, the frame shift of 3 frames may be used to synchronize the cameras. As will be apparent, the correlation is not determined between individual frames, as motion cannot be detected using only a single frame, but is instead detected over time/frame intervals (as described in block 304). Accordingly, the example depicted in FIG. 3 is overly simplistic. However, the concept of determining the frame shift is similar. The core idea is to detect movement in one time/frame interval from one video feed, find highly-correlated movement in a different time/frame interval from the other video feed, and then determine the shift (e.g., frame offset) between the two feeds.

Figure 4:
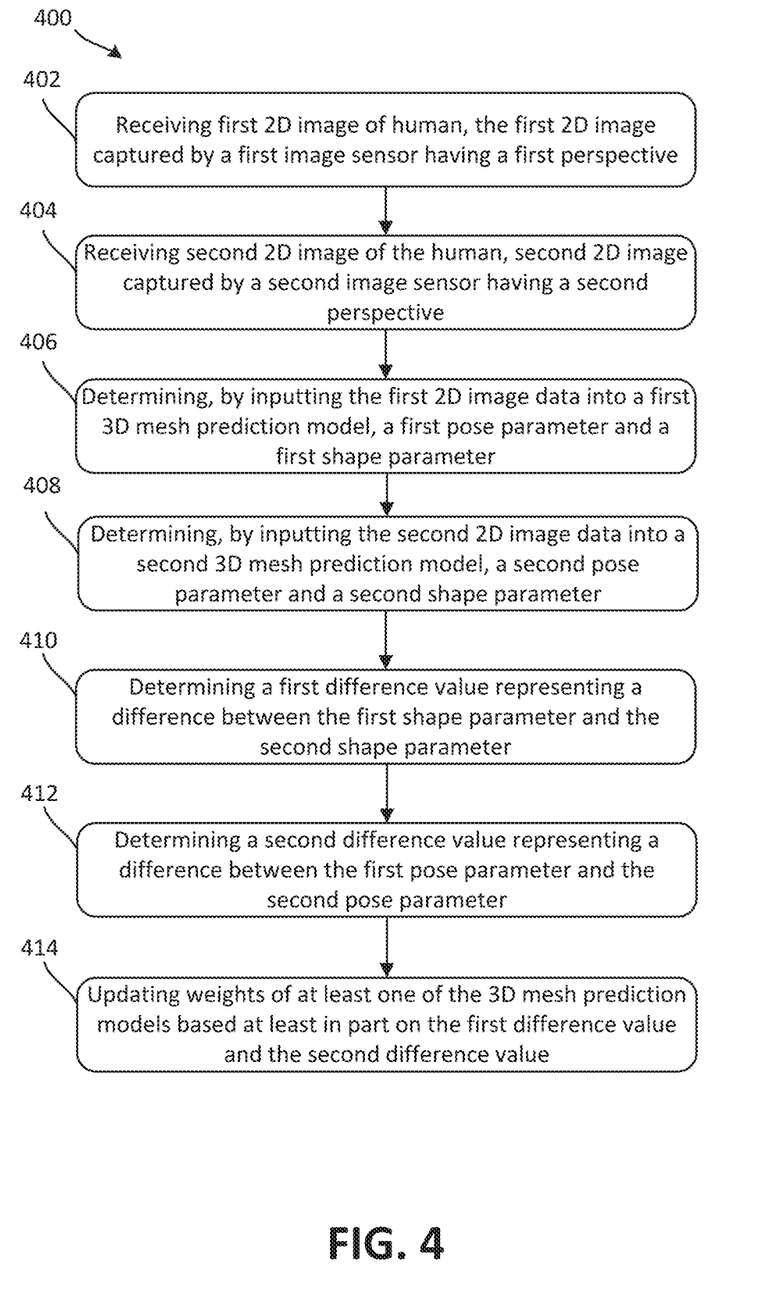
FIG. 4 is a flow chart depicting an example process for multi-view 3D mesh generation, in accordance with various aspects of the present disclosure.

FIG. 4 is a flow chart depicting an example process 400 for multi-view 3D mesh generation, in accordance with various aspects of the present disclosure. Those portions of FIG. 4 that have been previously discussed in reference to FIGS. 1-3 may not be described again for purposes of clarity and brevity. The actions of the process 400 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 400 of FIG. 4 may begin at action 402, at which a first 2D image representing a human may be received. The first 2D image may be captured by a first image sensor having a first perspective. For example, a device including a camera may capture an image of a user from a first viewpoint. The device may be a stationary device within the user's home (e.g., a desktop computing device, a virtual assistant device with an integrated camera, a mobile phone, etc.).

Processing may continue at action 404, at which a second 2D image representing the human may be received. The second 2D image may be captured by a second image sensor having a second perspective that is different from the first perspective. For example, a device that is different from the device which captured the first 2D image may be placed at a different vantage (e.g., according to on-screen instructions and/or spoken instructions) and may be used to capture an image of the user from a different angle. In various examples, the system may enter a calibration mode in which the video and/or frames of image data captured by each of the cameras is synchronized. For example, the videos may be synchronized using one or more of the synchronization procedures described above in reference to FIG. 3. In at least some examples, 3D mesh prediction models (as configured in the Siamese architecture described herein) may be trained using synchronized images at the beginning of any new session (e.g., anytime the cameras are repositioned and/or need to be resynchronized). This may allow the system to generate not only pose and shape parameters that account for different camera viewpoints, but also to account for the specific physical environment and lighting conditions that are currently present.

Processing may continue at action 406, at which a first pose parameter and a first shape parameter may be determined by inputting the first 2D image data into a first 3D mesh prediction model. For example, as described in reference to FIG. 1, the first 2D image data of the user may be input into an HMR model, a SPIN model, and/or some other 3D mesh prediction model. In some examples, 2D joint data may be available (e.g., determined using joint detection techniques employed during system calibration) as part of the input to the 3D mesh prediction model. The first 3D mesh prediction model may output a first pose parameter $\theta_1$ a first shape parameter representing a pose and a shape for a human mesh for the first 2D image data.

Processing may continue at action 408, at which a second pose parameter and a second shape parameter may be determined by inputting the second 2D image data into a second 3D mesh prediction model. For example, as described in reference to FIG. 1, the second 2D image data of the user may be input into a second HMR model, a second SPIN model, and/or some other 3D mesh prediction model. As previously described, the second 3D mesh prediction model may share weights with the first 3D mesh prediction model. In some examples, 2D joint data may be available (e.g., determined using joint detection techniques employed during system calibration) as part of the input to the second 3D mesh prediction model. The second 3D mesh prediction model may output a second pose parameter $\theta_2$ and a second shape parameter $\beta_2$ representing a pose and a shape for a human mesh for the second 2D image data. Since the first image data and the second image data represent images of the human that were captured at the same moment in time, albeit from different perspectives, the first pose parameter $\theta_1$ and the second pose parameter $\theta_2$ should be very similar. Similarly the first shape parameter and the second shape parameter $\beta_2$ should be very similar.

Processing may continue at action 410, at which a first difference value representing a difference between the first shape parameter and the second shape parameter $\beta_2$ may be determined. Similarly, at action 412, a second difference value representing a difference between the first pose parameter $\theta_2$ and the second pose parameter $\theta_2$ may be determined.

Thereafter, at action 414, weights of the first and/or second 3D mesh prediction models may be updated based at least in part on the first difference value and the second difference value. For example, L2 similarity losses may be determined for both pose and shape parameters and these losses may be minimized during training to force the two 3D mesh prediction models to output similar pose and shape parameters. After training (e.g., after calibrating the system for a current session) the two 3D mesh prediction models may share weights and may be used to accurately predict 3D body meshes during a session (e.g., during a video game session, exercise session, etc.). Advantageously, the two 3D mesh prediction models may better represent the scene relative to a single camera since having two different perspectives provides additional information about both the scene and the human that is represented within the scene.

Figure 5:
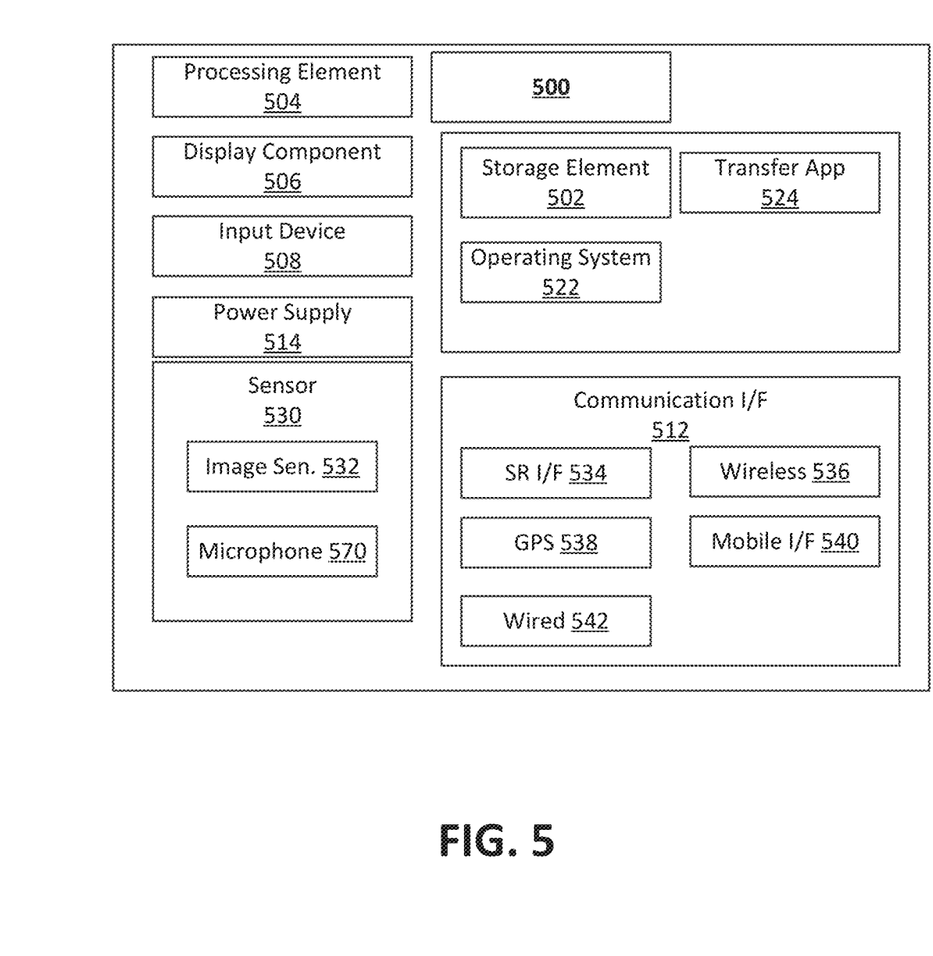
FIG. 5 is a block diagrams showing an example architecture of a computing device that may be used in accordance with various embodiments described herein.

FIG. 5 is a block diagram showing an example architecture 500 of a computing device that may be used to perform multi-view 3D mesh generation, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store parameters, and/or machine learning models generated using the various techniques described herein.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display input images and/or 3D meshes generated in accordance with the various techniques described herein.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information.

As noted above, multiple devices may be employed in a single system. In such a multi-device system, each of the devices may include different components for performing different aspects of the system's processing. The multiple devices may include overlapping components. The components of the computing device(s) 102, as described herein, are exemplary, and may be located as a stand-alone device or may be included, in whole or in part, as a component of a larger device or system.

Figure 6:
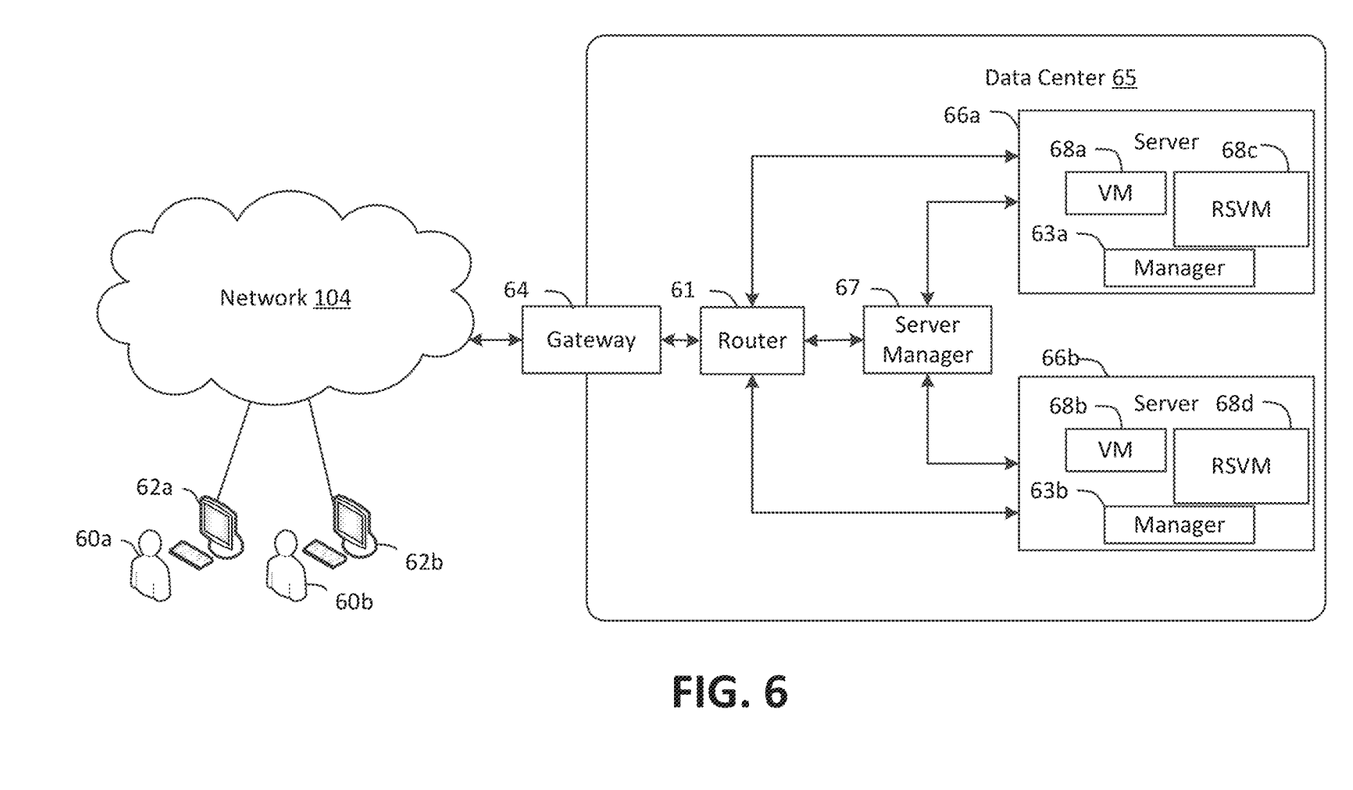
FIG. 6 is a diagram illustrating an example system for sending and providing data that may be used in accordance with the present disclosure.

An example system for sending and providing data will now be described in detail. In particular, FIG. 6 illustrates an example computing environment in which the embodiments described herein may be implemented. For example, the computing environment of FIG. 6 may be used to provide multi-view 3D mesh generation as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various multi-view 3D mesh generation techniques described herein.

These services may be configurable with set or custom applications and may be configurable in size, execution, cost, latency, type, duration, accessibility and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution systems (such as application server instances, Java™ virtual machines (JVMs), general-purpose or special-purpose operating systems that support various interpreted or compiled programming languages such as Ruby, Perl, Python, C, C++ and the like or high-performance computing systems) suitable for the applications, without, for example, requiring the client to access an instance or an execution system directly. A given execution system may utilize one or more resource instances in some implementations; in other implementations, multiple execution systems may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware system, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method of predicting mesh data, comprising:
receiving first two-dimensional (2D) image data representing a human body, wherein the first 2D image data is captured by a first image sensor having a first field-of-view;
receiving second 2D image data representing the human body, wherein the second 2D image data is captured by a second image sensor having a second field-of-view different from the first field-of-view;
determining, by inputting the first 2D image data into a first three-dimensional (3D) mesh prediction model, a first pose parameter $\theta_1$ and a first shape parameter $\beta_1$;
determining, by inputting the second 2D image data into a second 3D mesh prediction model, a second pose parameter $\theta_2$ and a second shape parameter $\beta_2$;
determining a first difference value representing a difference between the first shape parameter $\beta_1$ and the second shape parameter $\beta_1$;
determining a second difference value representing a difference between the first pose parameter $\theta_1$ and the second pose parameter $\theta_2$;
updating the first 3D mesh prediction model using the first difference value and the second difference value to generate an updated 3D mesh prediction model; and
generating, by the updated 3D mesh prediction model, a 3D representation of the human body.

2. The method of claim 1, further comprising:
receiving a first series of frames of 2D image data from the first image sensor, the first series of frames of 2D image data representing the human body from a first perspective;
receiving a second series of frames of 2D image data from the second image sensor, the second series of frames of 2D image data representing the human body from a second perspective;
determining a first set of joints of the human body that change locations during the first series of frames of 2D image data;
determining a correlation between a frame of the first series of frames and a frame of the second series of frames based on a similarity between a movement of the first set of joints as represented in the first series of frames and movement of the first set of joints as represented in the second series of frames;
determining a frame shift between the frame of the first series of frames and the frame of the second series of frames; and
synchronizing the first image sensor and the second image sensor using the frame shift.

3. The method of claim 1, further comprising:
determining a set of camera parameters of the first image sensor, the set of camera parameters of the first image sensor comprising a first rotation parameter value and a first translation parameter value;
determining a set of camera parameters of the second image sensor, the set of camera parameters of the second image sensor comprising a second rotation parameter value and a second translation parameter value; and
generating a 2D representation of the 3D representation of the human body by reprojecting the 3D representation into 2D using the set of camera parameters of the first image sensor and the set of camera parameters of the second image sensor.

4. A method of generating three-dimensional (3D) representations, comprising:
receiving, from a first image sensor having a first perspective, first two-dimensional (2D) image data representing a human body;
receiving, from a second image sensor having a second perspective, second 2D image data representing the human body;
determining, using a first three-dimensional (3D) mesh prediction model and the first 2D image data, a first pose parameter and a first shape parameter;
determining, using a second 3D mesh prediction model and the second 2D image data, a second pose parameter and a second shape parameter; and
generating an updated 3D mesh prediction model from the first 3D mesh prediction model based at least in part on a first difference between the first pose parameter and the second pose parameter and a second difference between the first shape parameter and the second shape parameter.

5. The method of claim 4, further comprising:
receiving, from the first image sensor, third 2D image data representing the human body in a first pose;
generating, using the updated 3D mesh prediction model, a third pose parameter and a third shape parameter; and
generating a 3D mesh representation of the human body in the first pose based at least in part on the third pose parameter and the third shape parameter.

6. The method of claim 5, further comprising:
determining at least one camera parameter of the first image sensor; and
projecting the 3D mesh representation into a 2D image using the at least one camera parameter.

7. The method of claim 4, further comprising:
determining a correspondence between a first movement of at least one joint represented in first frames captured by the first image sensor and a second movement of the at least one joint represented in second frames captured by the second image sensor;
determining a frame shift between the first frames and the second frames; and
synchronizing image data captured by the first image sensor with image data captured by the second image sensor using the frame shift.

8. The method of claim 4, further comprising causing first instructions to be output by a device with which the first image sensor communicates, the first instructions describing a location at which to position the first image sensor relative to the second image sensor.

9. The method of claim 4, further comprising determining an adversarial loss associated with a discriminator of the first 3D prediction model, wherein the updated 3D mesh prediction model is further generated based at least in part on the adversarial loss.

10. The method of claim 4, further comprising determining a reprojection loss comprising a difference between a location of a first joint in a 2D reprojection of a 3D mesh representation of the human body output by the first 3D mesh prediction model and a location of a corresponding joint of the first 2D image data, wherein the updated 3D mesh prediction model is further generated based at least in part on the reprojection loss.

11. The method of claim 4, further comprising:
   receiving, from the first image sensor, third 2D image data representing the human body in a first pose;
   generating a 3D mesh representation of the human body in the first pose using the updated 3D mesh prediction model;
   comparing the first pose, as represented in the 3D mesh representation, with a second pose stored in memory; and
   determining a corrective action used to conform the first pose to the second pose.

12. The method of claim 11, further comprising generating instructions to cause a first computing device configured in communication with the first image sensor to output a visual representation of the corrective action.

13. A system comprising:
   at least one processor; and
   non-transitory computer-readable memory storing instructions that, when executed by the at least one processor, are effective to:
      receive, from a first image sensor having a first perspective, first two-dimensional (2D) image data representing a human body;
      receive, from a second image sensor having a second perspective, second 2D image data representing the human body;
      determine, using a first three-dimensional (3D) mesh prediction model and the first 2D image data, a first pose parameter and a first shape parameter;
      determine, using a second 3D mesh prediction model and the second 2D image data, a second pose parameter and a second shape parameter; and
      generate an updated 3D mesh prediction model from the first 3D mesh prediction model based at least in part on a first difference between the first pose parameter and the second pose parameter and a second difference between the first shape parameter and the second shape parameter.

14. The system of claim 13, the non-transitory computer-readable memory storing further instructions that, when executed by the at least one processor, are further effective to:
   receive, from the first image sensor, third 2D image data representing the human body in a first pose;
   generate, using the updated 3D mesh prediction model, a third pose parameter and a third shape parameter; and
   generate a 3D mesh representation of the human body in the first pose based at least in part on the third pose parameter and the third shape parameter.

15. The system of claim 14, the non-transitory computer-readable memory storing further instructions that, when executed by the at least one processor, are further effective to:
   determine at least one camera parameter of the first image sensor; and
   project the 3D mesh representation into a 2D image using the at least one camera parameter.

16. The system of claim 13, the non-transitory computer-readable memory storing further instructions that, when executed by the at least one processor, are further effective to:
   determine a correspondence between a first movement of at least one joint represented in first frames captured by the first image sensor and a second movement of the at least one joint represented in second frames captured by the second image sensor;
   determine a frame shift between the first frames and the second frames; and
   synchronize image data captured by the first image sensor with image data captured by the second image sensor using the frame shift.

17. The system of claim 13, the non-transitory computer-readable memory storing further instructions that, when executed by the at least one processor, are further effective to cause first instructions to be output by a device with which the first image sensor communicates, the first instructions describing a location at which to position the first image sensor relative to the second image sensor.

18. The system of claim 13, the non-transitory computer-readable memory storing further instructions that, when executed by the at least one processor, are further effective to determine an adversarial loss associated with a discriminator of the first 3D prediction model, wherein the updated 3D mesh prediction model is further generated based at least in part on the adversarial loss.

19. The system of claim 18, the non-transitory computer-readable memory storing further instructions that, when executed by the at least one processor, are further effective to determine a reprojection loss comprising a difference between a location of a first joint in a 2D reprojection of a 3D mesh representation of the human body output by the first 3D mesh prediction model and a location of a corresponding joint of the first 2D image data, wherein the updated 3D mesh prediction model is further generated based at least in part on the reprojection loss.

20. The system of claim 13, the non-transitory computer-readable memory storing further instructions that, when executed by the at least one processor, are further effective to:
   receive, from the first image sensor, third 2D image data representing the human body in a first pose;
   generate a 3D mesh representation of the human body in the first pose using the updated 3D mesh prediction model;
   compare the first pose, as represented in the 3D mesh representation, with a second pose stored in memory; and
   determine a corrective action used to conform the first pose to the second pose.

* * * * *